United States Patent
Farley et al.

(10) Patent No.: US 7,135,526 B2
(45) Date of Patent: Nov. 14, 2006

(54) VERY LOW DENSITY POLYETHYLENE AND HIGH DENSITY POLYETHYLENE BLENDS

(75) Inventors: James M. Farley, League City, TX (US); Richard W. Halle, Houston, TX (US); George Panagopoulos, Atlanta, GA (US); Jerry M. Johnson, League City, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/297,900

(22) PCT Filed: Jun. 22, 2001

(86) PCT No.: PCT/US01/20078

§ 371 (c)(1), (2), (4) Date: May 21, 2003

(87) PCT Pub. No.: WO01/98409

PCT Pub. Date: Dec. 27, 2001

(65) Prior Publication Data

US 2004/0014895 A1    Jan. 22, 2004

(51) Int. Cl.
*C08L 23/00* (2006.01)
*C08L 23/04* (2006.01)

(52) U.S. Cl. .................................. 525/191; 525/240

(58) Field of Classification Search ................ 525/191, 525/240

See application file for complete search history.

(56) References Cited

U.S. PATENT DOCUMENTS

| | | | | |
|---|---|---|---|---|
| 3,645,992 A | * | 2/1972 | Elston | 526/169.2 |
| 4,770,912 A | | 9/1988 | Furrer et al. | 428/35 |
| 5,272,236 A | | 12/1993 | Lai et al. | 526/348.5 |
| 5,278,272 A | | 1/1994 | Lai et al. | 526/348.5 |
| 5,382,631 A | | 1/1995 | Stehling et al. | 525/240 |
| 5,530,065 A | * | 6/1996 | Farley et al. | 525/240 |
| 5,677,383 A | * | 10/1997 | Chum et al. | 525/240 |
| 5,714,547 A | | 2/1998 | Li et al. | 525/240 |
| 5,847,053 A | * | 12/1998 | Chum et al. | 525/240 |
| 5,858,491 A | | 1/1999 | Geussens et al. | 428/36.9 |
| 5,883,188 A | * | 3/1999 | Hwang et al. | 525/71 |
| 5,911,665 A | * | 6/1999 | Heydarpour et al. | 53/449 |
| 6,120,887 A | * | 9/2000 | Werenicz et al. | 428/219 |

FOREIGN PATENT DOCUMENTS

| | | |
|---|---|---|
| WO | WO9635750 | 11/1996 |
| WO | WO9722470 | 6/1997 |

* cited by examiner

Primary Examiner—Nathan M. Nutter
(74) Attorney, Agent, or Firm—Leandro Arechederra

(57) ABSTRACT

Blends of very low density polyethylene produced using metallocene catalysts (mVLDPE) and high density polyethylene (HDPE) are disclosed. The polymer blends include a metallocene-catalyzed VLDPE polymer having a density of less than 0.916 g/cm$^3$, the VLDPE polymer preferably being linear and without long chain branching, and a HDPE polymer having a density of greater than 0.940 g/cm$^3$. The polymer blends are particularly suitable in blown and cast film applications.

31 Claims, No Drawings

VERY LOW DENSITY POLYETHYLENE AND HIGH DENSITY POLYETHYLENE BLENDS

1. FIELD OF THE INVENTION

The present invention relates generally to polyolefin blends and films produced from polyolefin blends. More specifically, the present invention is directed to blends of very low density polyethylene produced using metallocene catalysts and high density polyethylene, and products, such as films, formed of such blends.

2. BACKGROUND

Various types of polyethylenes are known in the art. Low density polyethylene ("LDPE") can be prepared at high pressure using free radical initiators, or in gas phase processes using Ziegler-Natta or vanadium catalysts, and typically has a density in the range of 0.916–0.940 g/cm$^3$. LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain long chain branching is also known; this "linear low density polyethylene" ("LLDPE") can be produced with conventional Ziegler-Natta catalysts or with metallocene catalysts. Relatively higher density LDPE, typically in the range of 0.928 to 0.940 g/cm$^3$, is sometimes referred to as medium density polyethylene ("MDPE"). Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$.

U.S. Pat. Nos. 5,272,236 and 5,278,272 disclose polyethylenes termed "substantially linear ethylene polymers" ("SLEPs"). These SLEPs are characterized as having a polymer backbone substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons. As used herein and in U.S. Pat. Nos. 5,272,236 and 5,278,272, a polymer with "long chain branching" is defined as one having a chain length of at least about 6 carbons, above which the length cannot be distinguished using $^{13}$C NMR spectroscopy. It is further disclosed that the long chain branch can be as long as about the same length as the length of the polymer backbone. As used in the present disclosure, the term "linear" is applied to a polymer that has a linear backbone and does not have long chain branching; ie., a "linear" polymer is one that does not have the long chain branches characteristic of an SLEP polymer.

U.S. Pat. No. 5,382,631 discloses linear interpolymer blends made from components having narrow Molecular weight distribution (e.g. Mw/Mn≦3) and a narrow composition distribution (e.g. CDBI>50%). The blends have either Mw/Ma>3 and/or CDBI<50%, and combinations of each, and can be bimodal with respect to either or both molecular weight and/or comonomer content. The blends are generally free of blend components having both a higher average molecular weight and a lower average comonomer content than another blend component.

3. SUMMARY OF INVENTION

In general, the present invention is directed to a polymer blend, the blend including a very low density polyethylene (VLDPE) polymer having a density of less than 0.916 g/m$^3$, and a high density polyethylene (HDPE) having a density of greater than 0.940 g/cm$^3$. The VLDPE polymer can be produced in a metallocene-catalyzed process, preferably a gas-phase metallocene-catalyzed process. The mVLDPE polymers of the present invention are characterized by a unique set of properties, including one or more of the following: (a) a composition distribution CDBI of 50 to 85%, alternatively 60 to 80% or 55 to 75% or 55% or more to 70% or less; (b) a molecular weight distribution Mw/Mn of 2 to 3, alternatively 2.2 to 2.8; (c) a molecular weight distribution Mz/Mw of less than 2; and (d) the presence of two peaks in a TREF measurement.

In one embodiment, the present invention is directed to a polymer blend, the blend including a metallocene-produced VLDPE polymer comprising an ethylene copolymer with a comonomer content of 25% or less by weight, preferably 20% or less by weight, and more preferably 15% or less by weight.

In another embodiment, the present invention is directed to a polymer blend, the blend including a metallocene-produced VLDPE polymer, preferably a gas-phase metallocene-produced VLDPE polymer, the VLDPE polymer being a copolymer of ethylene and at least one $C_3$ to $C_{12}$ alpha olefin and having a density of from 0.890 to 0.915 g/cm$^3$ and a melt index of from 0.1 to 20 g/10 min.

In another embodiment, the present invention is directed to a polymer blend, the blend including a gas-phase metallocene-produced VLDPE polymer, the VLDPE polymer being a copolymer of ethylene and 1-butene, 1-hexene, 4-methyl-1-pentene, or 1-octene and having a density from the lower limits of 0.890 g/cm$^3$, 0.900 g/cm$^3$, 0.905 g/cm$^3$, 0.910 g/cm$^3$ or 0.911 g/cm$^3$ to the upper limits of 0.915 g/cm$^3$ or 0.913 g/cm$^3$, a melt index of from 0.5 to 20 g/10 min, a composition distribution breadth index of 60 to 80 wt %, and a molecular weight distribution (Mw/Mn) of 2.2 to 2.8.

In another embodiment, the present invention is directed to blown or cast monolayer films formed from a blend including a mVLDPE polymer and a HDPE polymer.

In another embodiment, the present invention is directed to blown or cast multilayer films, wherein at least one layer of the multilayer film is formed of a blend including a mVLDPE polymer and a HDPE polymer.

In other embodiments, the invention is directed to articles including the films of the invention, articles wrapped with the films of the invention, and substrates coated with the films of the invention.

4. DETAILED DESCRIPTION

4.1 The VLDPE Component

In at least one specific embodiment, the polymer blends includes a VLDPE polymer made using a gas phase polymerization process. As used herein, the terms "very low density polyethylene" polymer and "VLDPE" polymer refer to a polyethylene polymer having a density of less than 0.916 g/cm$^3$. As used herein, the term "gas phase polymerization" refers to polymerization of polymers from monomers in a gas fluidized bed. For example, the VLDPEs of the present invention may be made by polymerizing alpha-olefins in the presence of a metallocene catalyst under reactive conditions in a gas phase reactor having a fluidized bed and a fluidizing medium. In a preferred embodiment, the VLDPE polymer may be made by polymerization in a single reactor (as opposed to multiple reactors). As discussed in greater detail below, a variety of gas phase polymerization processes may be used. For example, polymerization may be conducted in uncondensed or "dry" mode, condensed mode, or "super-condensed mode." In a specific embodiment, the liquid in the fluidizing medium can be maintained at a level greater than 2 weight percent based on the total weight of the fluidizing medium.

The material exiting the reactor includes a very low density polyethylene (VLDPE), having density within the ranges described elsewhere herein, e.g., having a density from 0.890 to 0.915, more narrowly a density from 0.910 to 0.915, and a stream comprising unreacted monomer gases. Following polymerization, the polymer is recovered. In certain embodiments, the stream can be compressed and cooled, and mixed with feed components, whereupon a gas-phase and a liquid phase are then returned to the reactor. In a preferred aspect, the invention VLDPEs are copolymers, made from ethylene monomers together with at least one comonomer, e.g., hexene or octene. Polymers having more than two types of monomers, such as terpolymers, are also included within the term "copolymer" as used herein. For example, VLDPE terpolymers may be made, using ethylene monomer together with any two of butene, hexene and octene. For one embodiment of the VLDPE polymer comprising an ethylene/butene copolymer, the molar ratio of butene to ethylene should be from about 0.015 to 0.035, preferably from 0.020 to 0.030. For one embodiment of the VLDPE polymer comprising an ethylene/hexene copolymer, the molar ratio of hexene to ethylene should be from about 0.015 to 0.035, preferably from 0.020 to 0.030. For one embodiment of the VLDPE polymer comprising an ethylene/octene copolymer, the molar ratio of octene to ethylene should be from about 0.015 to 0.035, preferably from 0.020 to 0.030.

The comonomers that are useful in general for making VLDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene, more preferably 1-butene, 1-hexene, and 1-octene.

Although not generally preferred, other useful comonomers include polar vinyl, conjugated and non-conjugated dienes, acetylene and aldehyde monomers, which can be included in minor amounts in terpolymer compositions. Non-conjugated dienes useful as comonomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the VLDPE polymer and the specific comonomers selected. In general, the comonomer may be present in an amount of 25% or less by weight, preferably 20% or less by weight and more preferably 15% or less by weight. In one embodiment, the comonomer may be present in an amount of 5% or more by weight. For a given comonomer, the density of the VLDPE polymer produced therefrom decreases as the comonomer content increases. One skilled in the art can readily determine the appropriate comonomer content appropriate to produce a VLDPE polymer having a desired density.

Metallocene catalysts are an important feature of this invention. For the purpose of this patent specification and the claims, a "metallocene catalyst" is defined to be at least one metallocene catalyst component containing one or more cyclopentadienyl moiety in combination with a transition metal. The active catalyst systems should include not only metallocene, but also an activator, such as an alumoxane or a derivative thereof (preferably MAO), an ionizing activator, a Lewis acid, or a combination thereof. The catalyst system is preferably supported on a carrier, typically an inorganic oxide or chloride or a resinous material such as polyethylene. Preferably, the catalyst system includes a metallocene component with single or multiple cyclopentadienyl components reacted with either a metal alkyl or alkoxy component or an ionic compound component. These catalysts can include partially and/or fully activated precursor compositions. The catalysts may be modified by prepolymerization or encapsulation. Specific metallocenes and catalyst systems useful in practicing the invention are disclosed in WO 96/11961 (International Application No. PCT/US95/12789) and WO 96/11960 (International Application No. PCT/US95/12737). Other non-limiting examples of metallocene catalysts and catalyst systems are discussed in U.S. Pat. Nos. 4,808,561, 5,017,714, 5,055,438, 5,064,802, 5,124,418, 5,153,157 and 5,324,800 all of the disclosures and teachings of which are incorporated by reference. Still other organometallic complexes and/or catalyst systems are described in Organometallics, 1999, 2046; PCT publications WO 96/23010, WO 99/14250, WO 98/50392, WO 98/41529, WO 98/40420, WO 98/40374, WO 98/47933; and European publications EP 0 881 233 and EP 0 890 581.

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst", i.e., an organometallic complex with a vacant coordination site that can coordinate, insert, and polymerize olefins. The metallocene catalyst precursor is preferably one of, or a mixture of metallocene compounds of either or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula $$(Cp^1R^1_m)R^3_n(Cp^2R^2_p)MX_q$$

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula $$(Cp^1R^1_m)R^3_n(Y_rR^2)MX_s$$

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of biscyclopentadienyl metallocenes of the type described in group (1) above for producing the m-VLDPE polymers of the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting, examples of suitable biscyclopentadienyl metallocenes of the type described in group (1) above are the racemic isomers of:

μ-$(CH_3)_2$Si(indenyl)$_2$M(Cl)$_2$;
μ-$(CH_3)_2$Si(indenyl)$_2$M(CH$_3$)$_2$;
μ-$(CH_3)_2$Si(tetrahydroindenyl)$_2$M(Cl)$_2$;
μ-$(CH_3)_2$Si(tetrahydroindenyl)$_2$M(CH$_3$)$_2$;
μ-$(CH_3)_2$Si(indenyl)$_2$M(CH$_2$CH$_3$)$_2$; and
μ-$(C_6H_5)_2$C(indenyl)$_2$M(CH$_3$)$_2$;
wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

μ-$(C_6H_5)_2$C(cyclopentadienyl)(fluorenyl)M(R)$_2$;
μ-$(C_6H_5)_2$C(3-methylcyclopentadienyl)(fluorenyl)M(R)$_2$;
μ-$(CH_3)_2$C(cyclopentadienyl)(fluorenyl)M(R)$_2$;
μ-$(C_6H_5)_2$C(cyclopentadienyl)(2-methylindenyl)M(CH$_3$)$_2$;
μ-$(C_6H_5)_2$C(3-methylcyclopentadienyl)(2-methylindenyl)M(Cl)$_2$;
μ-$(C_6H_5)_2$C(cyclopentadienyl)(2,7-dimethylfluorenyl)M(R)$_2$; and
μ-$(CH_3)_2$C(cyclopentadienyl)(2,7-dimethylfluorenyl)M(R)$_2$;
wherein M is Zr or Hf, and R is Cl or CH$_3$.

Examples of suitable monocyclopentadienyl metallocenes of the type described in group (2) above are disclosed in U.S. Pat. Nos. 5,026,798; 5,057,475; 5,350,723; 5,264,405; 5,055,438; and in WO 96/002244.

Illustrative, but not limiting, examples of preferred monocyclopentadienyl metallocenes of the type described in group (2) above are:

μ-$(CH_3)_2$Si(cyclopentadienyl)(1-adamantylamido)M$(R)_2$;
μ-$(CH_3)_2$Si(3-tertbutylcyclopentadienyl)(1-adamantylamido)M$(R)_2$;
μ-$(CH_2$(tetramethylcyclopentadienyl)(1-adamantylamido) M$(R)_2$;
μ-$(CH_3)_2$Si(tetramethylcyclopentadienyl)(1-adamantylamido)M$(R)_2$;
μ-$(CH_3)_2$C(tetramethylcyclopentadienyl)(1-adamantylamido)M$(R)_2$;
μ-$(CH_3)_2$Si(tetramethylcyclopentadienyl)(1-tertbutylamido) M$(R)_2$;
μ-$(CH_3)_2$Si(fluorenyl)(1-tertbutylamido)M$(R)_2$;
μ-$(CH_3)_2$Si(tetramethylcyclopentadienyl)(1-cyclododecylamido)M$(R)_2$; and
μ-$(C_6H_5)_2$C(tetramethylcyclopentadienyl)(1-cyclododecylamido)M$(R)_2$;
wherein M is Ti, Zr or Hf, and R is Cl or $CH_3$.

Other organometallic complexes that are useful catalysts for the VLDPE polymers described herein are those with diimido ligand systems, such as are described in WO 96/23010. Other references describing suitable organometallic complexes include Organometallics, 1999, 2046; PCT publications WO 99/14250, WO 98/50392, WO 98/41529, WO 98/40420, WO 98/40374, WO 98/47933; and European publications EP 0 881 233 and EP 0 890 581.

The metallocene compounds and/or other organometallic complexes are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

An additional method of making metallocene catalysts uses ionizing anionic pre-cursors which are initially neutral Lewis acids but form the cation and anion upon ionizing reaction with the metallocene compounds. For example, tris(pentafluorophenyl) boron acts to abstract an alkyl, hydride or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:
trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;
tributylammonium tetrakis(pentafluorophenyl)borate; and
tri(n-butyl)ammonium tetrakis(o-tolyl)borate;
N,N-dialkyl anilinium salts such as:
N,N-dimethylanilinium tetrakis(pentafluorophenyl)borate;
N,N-dimethylaniliniumtetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate; and
N,N-2,4,6-pentamethylanilinium tetraphenylborate;
dialkyl ammonium salts such as:
di-(isopropyl)ammonium tetrakis(pentafluorophenyl)borate; and
dicyclohexylammonium tetraphenylborate; and
triaryl phosphonium salts such as:
triphenylphosphonium tetraphenylborate;
tri(methylphenyl)phosphonium tetraphenylborate; and
tri(dimethylphenyl)phosphonium tetraphenylborate.

Further examples of suitable anionic precursors include those including a stable carbonium ion, and a compatible non-coordinating anion. These include:
tropillium tetrakis(pentafluorophenyl)borate;
triphenylmethylium tetrakis(pentafluorophenyl)borate;
benzene (diazonium) tetrakis(pentafluorophenyl)borate;
tropillium phenyltris(pentafluorophenyl)borate;
triphenylmethylium phenyl-(trispentafluorophenyl)borate;
benzene (diazonium) phenyl-tris(pentafluorophenyl)borate;
tropillium tetrakis(2,3,5,6-tetrafluorophenyl)borate;
triphenylmethylium tetrakis(2,3,5,6-tetrafluorophenyl)borate;
benzene (diazonium) tetrakis(3,4,5-trifluorophenyl)borate;
tropillium tetrakis(3,4,5-trifluorophenyl)borate;
benzene (diazonium) tetrakis(3,4,5-trifluorophenyl)borate;
tropillium tetrakis(3,4,5-trifluorophenyl)aluminate;
triphenylmethylium tetrakis(3,4,5-trifluorophenyl)aluminate;
benzene (diazonium) tetrakis(3,4,5-trifluorophenyl)aluminate;
tropillinum tetrakis(1,2,2-trifluoroethenyl)borate;
triphenylmethylium tetrakis(1,2,2-trifluoroethenyl)borate;
benzene (diazonium) tetrakis(1,2,2-trifluoroethenyl)borate;
tropillium tetrakis(2,3,4,5-tetrafluorophenyl)borate;
triphenylmethylium tetrakis(2,3,4,5-tetrafluorophenyl)borate; and
benzene (diazonium) tetrakis(2,3,4,5-tetrafluorophenyl)borate.

Where the metal ligands include halide moieties, for example, (methyl-phenyl) silylene(tetra-methyl-cyclopentadienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for akylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula $(R-Al-O)_n$, which is a cyclic compound, or $R(R-Al-O)_nAlR_2$, which is a linear compound. In these formulae, each R or $R_2$ is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, tri-isobutyl aluminum, isobutyl alumnumoxane, those having bulky substituents covalently bound to the metal or metalloid center being preferred to minimize adverse interaction with the active catalyst.

The material exiting the reactor includes the VLDPE polymer and a stream containing unreacted monomer gases. Following polymerization, the polymer is recovered. In certain embodiments, the stream can be compressed and cooled, and mixed with feed components, whereupon a gas phase and a liquid phase are then returned to the reactor.

Generally, in carrying out the gas phase polymerization processes described herein, the reactor temperature can be in the range of about 50° C. to about 110° C., sometimes higher. However, the reactor temperature should not exceed the melting point of the VLDPE being formed. An illustrative reactor temperature is about 80° C. The reactor pressure should be 100 to 1000 psig, preferably about 150 to 600 psig, more preferably 200 to about 500 psig and most preferably between 250 to 400 psig.

Preferably, the process is operated in a continuous cycle. A specific, non-limiting embodiment of the gas phase polymerization process that is operated in a continuous cycle will now be described, it being understood that other forms of gas polymerization may also be used.

A gaseous stream containing one or more monomers is continuously passed through the fluidized bed under reactive conditions in the presence of a metallocene catalyst. This gaseous stream is withdrawn from the fluidized bed and recycled back into the reactor. Simultaneously, polymer product may be withdrawn from the reactor and new monomer or monomers are added to replace the reacted monomer(s). In one part of the cycle, in a reactor, a cycling gas stream is heated by the heat of polymerization. This heat is removed in another part of the cycle by a cooling system external to the reactor. Heat generated by the reaction may be removed in order to maintain the temperature of the gaseous stream inside the reactor at a temperature below the polymer and catalyst degradation temperatures. Further, it is often desirable to prevent agglomeration or formation of chunks of polymer that cannot be removed as product. This may be accomplished in a variety of art-recognized ways, e.g., through control of the temperature of the gaseous stream in the reaction bed to a temperature below the fusion or sticking temperature of the polymer particles produced during the polymerization reaction.

Heat should be removed, since the amount of polymer produced in the fluidized bed polymerization process is generally related to the amount of heat that can be withdrawn from a reaction zone in a fluidized bed within the reactor. During the gas phase polymerization process, heat can be removed from the gaseous recycle stream by cooling the stream outside the reactor. The velocity of the gaseous recycle stream in a fluidized bed process should be sufficient to maintain the fluidized bed in a fluidized state. In certain conventional fluidized bed reactors, the amount of fluid circulated to remove the heat of polymerization is often greater than the amount of fluid required for support of the fluidized bed and for adequate mixing of the solids in the fluidized bed. However, to prevent excessive entrainment of solids in a gaseous stream withdrawn from the fluidized bed, the velocity of the gaseous stream should be regulated.

The recycle stream can be cooled to a temperature below the dew point, resulting in condensing a portion of the recycle stream, as described in U.S. Pat. No. 4,543,399 and U.S. Pat. No. 4,588,790, the disclosures of which are incorporated herein by reference to the extent not inconsistent with the present inventions. As set forth in those patents, the resulting stream containing entrained liquid should be returned to the reactor without the aforementioned agglomeration and/or plugging that may occur when a liquid is introduced during the fluidized bed polymerization process. For purposes of this patent, this intentional introduction of a liquid into a recycle stream or reactor during the process is referred to generally as a "condensed mode" operation of the gas phase polymerization process. As taught by the above mentioned patents, when a recycle stream temperature is lowered to a point below its dew point in "condensed mode" operation, an increase in polymer production is possible, as compared to production in a "non-condensing" or "dry" mode because of increased cooling capacity. Also, a substantial increase in space time yield, the amount of polymer production in a given reactor volume, can be achieved by operating in "condensed mode" with little or no change in product properties. Also, in certain "condensed mode" operations, the liquid phase of the two-phase gas/liquid recycle stream mixture remains entrained or suspended in the gas phase of the mixture. The cooling of the recycle stream to produce this two-phase mixture results in a liquid/vapor equilibrium. Vaporization of the liquid occurs when heat is added or pressure is reduced. The increase in space time yields are the result of this increased cooling capacity of the recycle stream which, in turn, is due both to the greater temperature differential between the entering recycle stream and the fluidized bed temperature and to the vaporization of condensed liquid entrained in the recycle stream. In a specific non-limiting embodiment of the process described herein for making VLDPEs with improved toughness, a "condensed mode" of operation is utilized.

In operating the gas phase polymerization process to obtain the VLDPEs of this invention, the amount of polymer and catalyst, the operating temperature of the reactor, the ratio of comonomer(s) to monomer and the ratio of hydrogen to monomer should be determined in advance, so that the desired density and melt index can be achieved.

Although a variety of gas polymerization processes may be used to make the polyolefins of the present inventions, including "non-condensed" or "dry" mode, it is preferred to use any one of a variety of "condensed mode" processes, including the condensed mod-e processes described in the above patents, as well as imp-roved "condensed mode" gas polymerization processes, such as those disclosed in Griffin et al., U.S. Pat. No. 5,462,999, and U.S. Pat. No. 5,405,922, which are hereby incorporated by reference, to the extent not inconsistent with the processes disclosed herein. Other types of condensed mode processes are also applicable, including so-called "supercondensed mode" processes, as discussed in U.S. Pat. Nos. 5,352,749 and 5,436,304, both of which are fully incorporated by reference, to the extent not inconsistent with the inventions herein.

The "condensable fluids" that can be used in one of the condensed mode gas phase polymerization operations may include saturated or unsaturated hydrocarbons. Examples of suitable inert condensable fluids are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated C6 hydrocarbons, n-heptane, n-octane and other saturated C7 and C8 hydrocarbons or mixtures thereof. The preferred inert condensable hydrocarbons are C4 and C6 saturated hydrocarbons. The condensable fluids may also include polymerizable condensable comonomers such as olefins, alpha-olefins, diolefins, diolefins containing at least one alphaolefin or mixtures thereof including some of the aforementioned monomers which may be partially or entirely incorporated into the polymer product.

In any of the gas phase polymerization processes described herein, including those in the patents referenced herein, the unreacted monomers in the product stream may be recycled. Preferably, to make the VLDPEs of the invention with the desired density, the composition of the recycle stream should be carefully controlled so that the proper ratio of comonomers is maintained, as discussed above.

The density of the polyethylene having the improved properties of this invention ranges from the lower limits of 0.890 g/cm$^3$, 0.900 g/cm$^3$, 0.905 g/cm$^3$, 0.910 g/cm$^3$ or 0.911 g/cm$^3$ to the upper limits of 0.915 g/cm$^3$ or 0.913 g/cm$^3$.

The VLDPE polymer is further characterized by a melt index (MI) of from 0.5 to 20 g/10 min (dg/min), as measured in accordance with ASTM-1238 condition E. In one or more specific embodiments, alternative lower limits for the melt index include 0.7 and 1.0 g/10 min, and alternative upper limits for the melt index include 5, 10, 12 and 15 g/10 min, with melt index ranging from any lower limit to any upper limit being within the scope of the invention.

The preferred gas-phase, metallocene VLDPE polymers can be further characterized by a narrow composition distribution. As is well known to those skilled in the art, the composition distribution of a copolymer relates to the uniformity of distribution of comonomer among the molecules of the polymer. Metallocene catalysts are known to incorporate comonomer very evenly among the polymer molecules they produce. Thus, copolymers produced from a catalyst system having a single metallocene component have a very narrow composition distribution, in that most of the polymer molecules will have roughly the same comonomer content, and within each molecule the comonomer will be randomly distributed. By contrast, conventional Ziegler-Natta catalysts generally yield copolymers having a considerably broader composition distribution, with comonomer inclusion varying widely among the polymer molecules.

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982).

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a Mn≧15,000, where Mn is the number average molecular weight of the fraction. Any low weight fractions present generally represent a trivial portion of the VLDPE polymers. The remainder of this description and the appended claims maintain this convention of assuming all fractions have Mn≧15,000 in the CDBI measurement.

The VLDPE polymers can also be characterized by molecular weight distribution (MWD). Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems* 3rd ed., Hemisphere Pub. Corp., NY, (1989) 155–160; U.S. Pat. No. 4,540,753; Verstrate et al., *Macromolecules*, vol. 21, (1988) 3360; and references cited therein.

The VLDPE polymers recited in the claims below are preferably linear polymers, i.e., without long chain branching. As used in the present disclosure, the term "linear" is applied to a polymer that has a linear backbone and does not have long chain branching; i.e., a "linear" polymer is one that does not have the long chain branches characteristic of a SLEP polymer as defined in U.S. Pat. Nos. 5,272,236 and 5,278,272. Thus, a "substantially linear" polymer as disclosed in those patents is not a "linear" polymer because of the presence of long chain branching.

Preferred VLDPE polymers have one or more of the following characteristics, in addition to the density, melt index, and other parameters described herein:

(a) a composition distribution CDBI of 50 to 85%, alternatively 60 to 80% or 55 to 75%, or 55% or more to 70% or less;

(b) a molecular weight distribution Mw/Mn of 2 to 3, alternatively 2.2 to 2.8;

(c) a molecular weight distribution Mz/Mw of less than 2; and (d) the presence of two peaks in a TREF measurement.

Particularly preferred VLDPEs having some or all of these characteristics are the gas phase metallocene-produced VLDPEs described above.

Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method disclosed in the EXAMPLES section below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bimodal composition distribution (CD). Bimodal CD may also be determined by other methods known to those skilled in the art. One such alternate method for TREF measurement than can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491–499 (1994).

A preferred balance of properties, particularly in film application, according to the invention is achieved when the long chain branching of the VLDPE is reduced. Therefore, with respect to the catalyst structures described above, bis-Cp structures are preferred over mono-Cp structures, unbridged structures are preferred over bridged structures, and unbridged bis-Cp structures are the most preferred. Preferred catalyst systems which will minimize or eliminate long chain branching to produce polymers substantially free of or free of long chain branching are based on un-bridged bis-Cp zirconocenes, such as but not limited to bis (1-methyl-3-n-butyl cyclopentadiane) zirconium dichloride.

Symmetric metallocenes may be used to produce a VLDPE polymer of the present invention. Symmetric metallocenes include, but are not limited to, bis(methylcyclopentadienyl)zirconium dichloride, bis(1,3-dimethylcyclopentadienyl)zirconium dichloride, bis(1,2-dimethylcyclopentadienyl)zirconium dichloride, bis(1,2,4-trimethylcyclopentadienyl)zirconium dichloride, bis(1,2,3-trimethylcyclopentadienyl)zirconium dichloride, bis(tetramethylcyclopentadienyl)zirconium dichloride, bis(pentamethylcyclopentadienyl)zirconium dichloride, bis(ethylcyclopentadienyl)zirconium dichloride, bis(propylcyclopentadienyl)zirconium dichloride, bis(butylcyclopentadienyl)zirconium dichloride, bis(isobutylcyclopentadienyl)zirconium dichloride, bis(pentylcyclopentadienyl)zirconium dichloride, bis(isopentylcyclopentadienyl)zirconium dichloride, bis(cyclopentylcyclopentadienyl)zirconium dichloride, bis(phenylcyclopentadienyl)zirconium dichloride, bis(benzylcyclopentadienyl)zirconium dichloride, bis(trimethylsilylmethylcyclopentadienyl)zirconium dichloride, bis(cyclopropylmethylcyclopentadienyl)zirconium dichloride, bis(cyclopentylmethylcyclopentadienyl) zirconium dichloride, bis(cyclohexylmethylcyclopentadienyl)zirconium dichloride, bis(propenylcyclopentadienyl) zirconium dichloride, bis(butenylcyclopentadienyl) zirconium dichloride, bis(1,3-ethylmethylcyclopentadienyl)

zirconium dichloride, bis(1,3-propylmethylcyclopentadienyl)zirconium dichloride, bis(1,3-butylmethylcyclopentadienyl)zirconium dichloride, bis(1,3-isopropylmethylcyclopentadienyl)zirconium dichloride, bis(1,3-isobutylmethylcyclopentadienyl)zirconium dichloride, bis(1,3-methylcyclopentylcyclopentadienyl)zirconium dichloride, and bis(1,2,4-dimethylpropylcyclopentadienyl)zirconium dichloride.

Unsymmetric metallocenes may be used to produce a VLDPE polymer of the present invention. Unsymmetric metallocenes include, but are not limited to, cyclopentadienyl(1,3-dimethylcyclopentadienyl)zirconium dichloride, cyclopentadienyl(1,2,4-trimethylcyclopentadienyl)zirconium dichloride, cyclopentadienyl(tetramethylcyclopentadienyl)zirconium dichloride, cyclopentadienyl(pentamethylcyclopentadienyl)zirconium dichloride, cyclopentadienyl(propylcyclopentadienyl)zirconium dichloride, cyclopentadienyl(butylcyclopentadienyl)zirconium dichloride, cyclopentadienyl(pentylcyclopentadienyl)zirconium dichloride, cyclopentadienyl(isobutylcyclopentadienyl)zirconium dichloride, cyclopentadienyl(cyclopentylcyclopentadienyl)zirconium dichloride, cyclopentadienyl(isopentylcyclopentadienyl)zirconium dichloride, cyclopentadienyl(benzylcyclopentadienyl)zirconium dichloride, cyclopentadienyl(phenylcyclopentadienyl)zirconium dichloride, cyclopentadienyl(1,3-propylmethylcyclopentadienyl)zirconium dichloride, cyclopentadienyl(1,3-butylmethylcyclopentadienyl)zirconium dichloride, cyclopentadienyl(1,3-isobutylmethylcyclopentadienyl)zirconium dichloride, cyclopentadienyl(1,2,4-dimethylpropylcyclopentadienyl)zirconium dichloride, (tetramethylcyclopentadienyl)(methylcyclopentadienyl)zirconium dichloride, (tetramethylcyclopentadienyl)(1,3-dimethylcyclopentadienyl)zirconium dichloride, (tetramethylcyclopentadienyl)(1,2,4-trimethylcyclopentadienyl)zirconium dichloride, (tetramethylcyclopentadienyl)(propylcyclopentadienyl)zirconium dichloride, (tetramethylcyclopentadienyl)(cyclopentylcyclopentadienyl)zirconium dichloride, (pentamethylcyclopentadienyl)(methylcyclopentadienyl)zirconium dichloride, (pentamethylcyclopentadienyl)(1,3-dimethylcyclopentadienyl)zirconium dichloride, (pentamethylcyclopentadienyl)(>1,2,4-trimethylcyclopentadienyl)zirconium dichloride, (pentamethylcyclopentadienyl)(propylcyclopentadienyl)zirconium dichloride, (pentamethylcyclopentadienyl)(cyclopentylcyclopentadienyl)zirconium dichloride, cyclopentadienyl(ethyltetramentylcyclopentadienyl)zirconium dichloride, cyclopentadienyl(propyltetramentylcyclopentadienyl)zirconium dichloride, (methylcyclopentadienyl)(propyltetramentylcyclopentadienyl)zirconium dichloride, (1,3-dimethylcyclopentadienyl)(propyltetramentylcyclopentadienyl)zirconium dichloride, (1,2,4-trimethylcyclopentadienyl)(propyltetramentylcyclopentadienyl)zirconium dichloride, (propylcyclopentadienyl)(propyltetramentylcyclopentadienyl)zirconium dichloride, cyclopentadienyl(indenyl)zirconium dichloride, (methylcyclopentadienyl)(indenyl)zirconium dichloride, (1,3-dimethylcyclopentadienyl)(indenyl)zirconium dichloride, (1,2,4-trimethylcyclopentadienyl)(indenyl)zirconium dichloride, (tetramethylcyclopentadienyl)(indenyl)zirconium dichloride, (pentamethylcyclopentadienyl)(indenyl)zirconium dichloride, cyclopentadienyl(1-methylindenyl)zirconium dichloride, cyclopentadienyl(1,3-dimethylindenyl)zirconium dichloride, cyclopentadienyl(1,2,3-trimethylindenyl)zirconium dichloride, cyclopentadienyl(4,7-dimethylindenyl)zirconium dichloride, (tetramethylcyclopentadienyl)(4,7-dimethylinde>nyl)zirconium dichloride, (pentamethylcyclopentadienyl)(4,7-dimethylindenyl)zirconium dichloride, cyclopentadienyl(5,6-dimethylindenyl)zirconium dichloride, (pentamethylcyclopentadienyl)(5,6-dimethylindenyl)zirconium dichloride, and (tetramethylcyclopentadienyl)(5,6-dimethylindenyl)zirconium dichloride.

A preferred balance of film properties according to the invention is achieved when the long chain branching of the VLDPE is reduced, and more preferably when there is no long chain branching. Therefore, with respect to the catalyst structures described above, bis-Cp structures are preferred over mono-Cp structures, unbridged structures are preferred over bridged structures, and unbridged bis-Cp structures are the most preferred.

The preferred method for producing the catalyst of the invention is described below and can be found in U.S. application Ser. Nos. 265,533, filed Jun. 24, 1994, now abandoned, and 265,532, filed Jun. 24, 1994, now abandoned, both are hereto fully incorporated by reference in their entirety. In a preferred embodiment, the metallocene catalyst component is typically slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are preferably mixed together and added to a porous support such that the total volume of the metallocene solution and the activator solution or the metallocene and activator solution is less than four times the pore volume of the porous support, more preferably less than three times, even more preferably less than two times, and more preferably in the 1–1.5 times to 2.5–4 times range and most preferably in the 1.5 to 3 times range. Also, in the preferred embodiment, an antistatic agent is added to the catalyst preparation.

In one embodiment, the metallocene catalyst is prepared from silica dehydrated at 600° C. The catalyst is a commercial scale catalyst prepared in a mixing vessel with and agitator. An initial charge of 1156 pounds (462 Kg) toluene is added to the mixer. This was followed by mixing 925 pounds (421 Kg) of 30 percent by weight methyl aluminoxane in toluene. This is followed with 100 pounds (46 Kg) of 20 percent by weight bis(1,3-methyl-n-butyl cyclopentadienyl) zirconium dichloride in toluene (20.4 pounds (9.3 Kg) of contained metallocene). An additional 144 pounds (66 Kg) of toluene is added to the mixer to rinse the metallocene feed cylinder and allowed to mix for 30 minutes at ambient conditions. This is followed by 54.3 pounds (25 Kg) of an AS-990 in toluene, surface modifier solution, containing 5.3 pounds (2.4 Kg) of contained AS-990. An additional 100 pounds (46 Kg) of toluene rinsed the surface modifier container and was added to the mixer. The resulting slurry is vacuum dried at 3.2 psia (70.6 kPa) at 175° F. (79° C. ) to a free flowing powder. The final catalyst weight was 1093 pounds (497 Kg). The catalyst can have a final zirconium loading of 0.40% and an aluminum loading of 12.0%.

In one preferred embodiment a substantially homogenous catalyst system is preferred. For the purposes of this patent specification and appended claims, a "substantially homogenous catalyst" is one in which the mole ratio of the transition metal of the catalyst component, preferably with an activator, is evenly distributed throughout a porous support.

The procedure for measuring the total pore volume of a porous support is well known in the art. Details of one of these procedures is discussed in Volume 1, Experimental Methods in Catalytic Research (Academic Press, 1968) (specifically see pages 67–96). This preferred procedure involves the use of a classical BET apparatus for nitrogen absorption. Another method well know in the art is described in Innes, Total porosity and Particle Density of Fluid Catalysts By Liquid Titration, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1. component to the transition metal component is preferably in the range of ratios between 0.3:1 to 3:1.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670, 5,352,749, 5,405,922, 5,436,304, 5,453,471 and 5,462,999 all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

In one embodiment of the process of the invention the process is essentially free of a scavenger. For the purposes of this patent specification and appended claims the term "essentially free" means that during the process of the invention no more than 10 ppm of a scavenger based on the total weight of the recycle stream is present at any given point in time during the process of the invention.

In another embodiment of the process of the invention the process is substantially free of a scavenger. For the purposes of this patent specification and appended claims the term "substantially free" is defined to be that during the process of the invention no more than 50 ppm of a scavenger based on the total weight of a fluidized bed is present at any given point in time during the process of the invention.

In one embodiment during reactor start-up to remove impurities and ensure polymerization is initiated, a scavenger is present in an amount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In another embodiment of the process of the invention the scavenger is present in an amount sufficient until the catalyst of the invention has achieved a catalyst productivity on a weight ratio basis of greater than 1000 grams of polymer per gram of the catalyst, preferably greater than about 1500, more preferably greater than 2000, even more preferably greater than 2500, and most preferably greater than 3000.

In another embodiment of the process of the invention during start-up the scavenger is present in an amount sufficient until the catalyst of the invention has achieved a catalyst productivity 40 percent of that of steady-state, preferably less than 30 percent, even more preferably less than 20 percent and most preferably less than 10 percent. For the purposes of this patent specification and appended claims "steady state" is the production rate, weight of polymer being produced per hour.

The productivity of the catalyst or catalyst system is influenced by the main monomer, (i.e., ethylene or propylene) partial pressure. The preferred mole percent of the monomer, ethylene or propylene, is from about 25 to 90 mole percent and the monomer partial pressure is in the range of from about 75 psia (517 kPa) to about 300 psia (2069 kPa), which are typical conditions in a gas phase polymerization process.

When a scavenger is utilized in the process of the invention the scavenger can be introduced typically into the reactor directly or indirectly into the recycle stream or into any external means capable of introducing the scavenger into the reactor. Preferably the scavenger enters into the reactor directly, and most preferably directly into the reactor bed or below the distributor plate in a typical gas phase process, preferably after the bed is in a fluidized state. In one embodiment the scavenger can be introduced once, intermittently or continuously to the reactor system.

The scavenger used in the process of the invention is introduced to the reactor at a rate equivalent to 10 ppm to 100 ppm based on the steady state, production rate, and then scavenger introduction is stopped.

In yet another embodiment particularly during start-up the scavenger when used is introduced at a rate sufficient to provide an increase in catalyst productivity on a weight ratio basis of a rate of 200 grams of polymer per gram of catalyst per minute, preferably at a rate of 300, even more preferably at a rate of 400 and most preferably at a rate of 500.

In another embodiment, the mole ratio of the metal of the scavenger to the transition metal of the metallocene catalyst component equals about, about 0.2 multiplied by the ppm of a scavenger based on the production rate multiplied by the catalyst productivity in kilograms of polymer per gram of catalyst. The range of the mole ratio is from about 300 to 10. In a preferred embodiment, where an alkyl aluminum is used as the scavenger the mole ratio is represented as aluminum (Al) to transition metal, for example, zirconium, where the moles of. Al are based on the total amount of scavenger used.

It is also preferred that hydrogen not be added to the system simultaneously with the scavenger. It is also within the scope of this invention that the scavenger can be introduced on a carrier separate from that used when a supported metallocene catalyst system is used in the process of the invention.

Fines for the purpose of this patent specification and appended claims are polymer particles less than 125 mu in size. Fines of this size can be measured by using a standard 120 mesh unit sieve screen. In a preferred embodiment the amount of scavenger present in the reactor at any given point in time during the process of the invention the level of fines less than 125 mu is less than 10%, preferably less than 1%, more preferably less than 0.85% to less than 0.05%.

It is within the scope of the invention that a system external to the reactor for removing scavengers introduced in the process of the invention from the recycle stream may be used. This would then prevent the recycle of the scavenger back into the reactor and prevent scavenger build-up in the reactor system. It is preferred that such a system is placed prior to the heat exchanger or compressor in the recycle stream line. It is contemplated that such a system would condense the scavenger out of the fluidizing medium in the recycle stream line. It would be preferred that the fluidizing medium is treated to remove the scavenger, see for example U.S. Pat. No. 4,460,755, incorporated herein by reference.

It is also contemplated by the process of the invention that scavenger can be intermittently introduced during the process wherein greater than 90%, preferably greater than 95% of all the scavenger introduced is removed from the recycle stream. It is also contemplated by this invention that the catalyst or catalyst system or components thereof of the invention can be used upon start-up as a scavenger, however, this would be an expensive procedure.

In the most preferred embodiment of the invention the process is a gas phase polymerization process operating in a condensed mode. For the purposes of this patent specification and appended claims the process of purposefully introducing a recycle stream having a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment of the process of the invention the amount of scavenger utilized if any is used should be in a mole ratio less than 100, preferably less than 50, more preferably less than about 25 based on the mole ratio of the metal of the transition metal scavenger to the transition metal of the metallocene where the scavenger is an aluminum containing organometallic compound and the transition metal of the metallocene is a Group 4 metal then the mole ratio above is based on the moles of aluminum to the moles of the Group 4 metal of the catalyst.

Fouling is a term used to describe the collection of polymer deposits on surfaces in a reactor. Fouling is detrimental to all parts of a polymerization process, including the reactor and its associated systems, hardware, etc. Fouling is especially disruptive in areas restricting gas flow or liquid flow. The two major areas of primary concern are the heat exchanger and distributor plate fouling. The heat exchanger consists of a series of small diameter tubes arranged in a tube bundle. The distributor plate is a solid plate containing numerous small diameter orifices through which the gas contained in a recycle stream is passed through before entering the reaction zone or distributed into a bed of solid polymer in a fluidized bed reactor such as described in U.S. Pat. No. 4,933,149, incorporated herein by reference.

Fouling manifests itself as an increase in the pressure drop across either the plate, cooler, or both. Once the pressure drop becomes too high, gas or liquid can no longer be circulated efficiently by the compressor, and it is often necessary to shut the reactor down. Cleaning out the reactor can take several days and is very time consuming and costly.

Fouling can also occur in the recycle gas piping and compressor, but usually accompanies plate and cooler fouling.

To quantify the rate of fouling it is useful to define a fouling factor, F. F is the fraction of the area of a hole that is fouled. If F=0 (0%) then there is no fouling. Conversely, if F=1 (100%) the hole is completely plugged. It is possible to relate the fouling to the pressure drop, DELTA P, at a given time in terms of the pressure drop of a clean system, DELTA P0. As fouling increases DELTA P increases and is larger than the initial pressure drop, DELTA P0. F is given by the following expressions: [See equation in original] (I) Cooler Fouling [See Original Patent for Chemical Structure Diagram] (II) In general, when F is greater than about 0.3 to about 0.4 (30–40%) a reactor shutdown is inevitable. Preferably, F is less than 40%, preferably less than 30%, even more preferably less than 20%, still more preferably less than 15% and most preferably less than 10% to 0%. The rate of fouling, the change in F as a function of time, is used to quantify fouling. If no fouling occurs the rate of fouling is zero. A minimum acceptable rate of fouling for a commercial operation is about 12 percent/month or 0.4 percent/day, preferably less than 0.3 percent/day, even more preferably less than 0.2 percent/day and most preferably less than 0.1 percent/day.

Particle size is determined as follows; the particle size is measured by determining the weight of the material collected on a series of U.S. Standard sieves and determining the weight average particle size.

Fines are defined as the percentage of the total distribution passing through 120 mesh standard sieve.

In one embodiment, the process is operated using a metallocene catalyst based on bis(1,3-methyl-n-butyl cyclopentadienyl) zirconium dichloride is described in this example. It shows the fouling effect of operating a commercial reactor using TEAL. This example includes information from a startup of a commercial reactor on metallocene catalyst.

Possible optimizations of the gas phase polymerization process and additional catalyst preparations are disclosed in U.S. Pat. Nos. 5,763,543, 6,087,291, and 5,712,352, and PCT published applications WO 00/02930 and WO 00/02931.

Although the VLDPE polymer component of the VLDPE/HDPE blends of the invention has been discussed as a single polymer, blends of two or more such VLDPE polymers having the properties described herein are also contemplated.

4.2 The HDPE Component

The polymer blend also includes a high density polyethylene (HDPE) polymer. As used herein, the terms "high density polyethylene" polymer and "HDPE" polymer refer to a homopolymer or copolymer of ethylene having a density greater than 0.940 g/cm$^3$. Polymers having more than two types of monomers, such as terpolymers, are also included within the term "copolymer" as used herein. The comonomers that are useful in general for making HDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the HDPE polymer and the specific comonomers selected. One skilled in the art can readily determine the appropriate comonomer content appropriate to produce an HDPE polymer having a desired density.

In one embodiment, the HDPE polymer has a density of greater than 0.940 g/cm$^3$, preferably from 0.940 g/cm$^3$ to 0.970 g/cm$^3$, more preferably from 0.940 g/cm$^3$ to 0.960 g/cm$^3$. In one embodiment, the HDPE polymer may have a melt index from 0.01 to 45 g/10 min, as measured in accordance with ASTM-1238 condition E.

The HDPE polymer may be produced using any conventional polymerization process, such as a solution, a slurry, or a gas-phase process, and a suitable catalyst, such as a Ziegler-Natta catalyst or a metallocene catalyst.

Examples of suitable HDPEs include HDPEs available from ExxonMobil Chemical Co., Houston, Tex., under the HD, HAD, HMA, HRA, HRP, or HYA series or under the trademark PAXON®.

Although the HPDE polymer component of the VLDPE/HDPE blends of the invention has been discussed as a single polymer, blends of two or more such HDPE polymers having the properties described herein are also contemplated.

4.3 VLDPE-HDPE Blends

In one embodiment, the present invention provides a polymer blend, the blend including a VLDPE polymer and a HDPE polymer. The blend can include any of the VLDPE polymers described herein, preferably a metallocene-catalyzed VLDPE polymer, and more preferably a gas-phase produced metallocene catalyzed VLDPE polymer. The blend can include any of the HDPE polymers described herein.

The blends can be formed using conventional equipment and methods, such a by dry blending the individual components and subsequently melt mixing in a mixer, or by mixing the components together directly in a mixer, such as a Banbury mixer, a Haake mixer, a Brabender internal mixer, or a single or twin-screw extruder including a compounding extruder and a side-arm extruder used directly downstream of a polymerization process. Additionally, additives can be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol, stearates and hydrogenated rosins; UV stabilizers; heat stabilizers; antiblocking agents; release agents; anti-static agents; pigments; colorants; dyes; waxes; silica; fillers; talc and the like.

The blends include at least 2 weight percent and up to 98 weight percent of the VLDPE polymer, and at least 2 weight percent and up to 98 weight percent of the HDPE polymer, with these weight percents based on the total combined weight of the VLDPE and HDPE polymers of the blend. Alternative lower limits of the VLDPE polymer can be 15%, 30%, 45% or 60% by weight based on the total combined weight of the VLDPE and HDPE polymers of the blend. Alternative upper limits of the VLDPE polymer can be 95%, 90%, 85% by weight based on the total combined weight of the VLDPE and HDPE polymers of the blend. Ranges from any lower limit to any upper limit are within the scope of the invention. One embodiment of the blend includes from 60% to 95% by weight of the VLDPE polymer and 40% to 5% by weight of the HDPE polymer based on the total combined weight of the VLDPE and HDPE polymers of the blend. Another embodiment of the blend includes from 70% to 85% by weight of the VLDPE polymer and 30% to 15% by weight of the HDPE polymer based on the total combined weight of the VLDPE and HDPE polymers of the blend.

In one preferred embodiment, the polymer blend includes a metallocene-catalyzed VLDPE polymer having a density of less than 0.916 g/cm$^3$, and an HDPE polymer having a density greater than 0.940 g/cm$^3$.

In another preferred embodiment, the polymer blend includes a gas-phase metallocene-produced VLDPE polymer, the VLDPE polymer being a copolymer of ethylene and at least one $C_3$ to $C_{12}$ alpha olefin and having a density of from 0.900 to 0.915 g/cm$^3$ and a melt index of from 0.5 to 20 g/10 min; and a HDPE polymer, the HDPE polymer being a homopolymer of ethylene or a copolymer of ethylene and at least one $C_3$ to $C_{12}$ alpha olefin and having a density of greater than 0.940 g/cm$^3$, wherein the blend includes 2–98% by weight of the VLDPE polymer and 98–2% by weight of the HDPE polymer, preferably 60–95% by weight of the VLDPE polymer and 40–5% by weight of the HDPE polymer, based on the total combined weight of the VLDPE and HDPE polymers.

In any of these embodiments, the VLDPE polymer, the HDPE polymer, or both, can be blends of such polymers, i.e., the VLDPE polymer component of the blend can itself be a blend of two or more VLDPE polymers having the characteristics described herein, and alternatively or additionally, the HDPE polymer component of the blend can itself be a blend of two or more HDPE polymers having the characteristics described herein.

4.4 Films and Coatings

Polymer blends of the present invention are particularly suitable for film applications. It has been surprisingly found that films formed from polymer blends of the invention exhibit improved properties. The VDLPE/HDPE polymer blends of the invention can be used to form cast or blown films having a single layer (monolayer films) or multiple layers (multilayer films). When used in multilayer films, the VLDPE/HDPE polymer blends can be used in any layer of the film, or in more than one layer of the film, as desired. When more than one layer of the film is formed of a VLDPE/HDPE polymer blend of the present invention, each such layer can be individually formulated; i.e., the layers formed of the VLDPE/HDPE polymer can be the same or different chemical composition, density, melt index, thickness, etc., depending upon the desired properties of the film.

One aspect of the invention relates to the formation of monolayer films from the VLDPE/HDPE polymer blends of the present invention. These films may be formed by any number of well known extrusion or coextrusion techniques discussed below. Films of the invention may be unoriented, uniaxially oriented or biaxially oriented. Physical properties of the film may vary depending on the film forming techniques used.

Another aspect of the invention relates to the formation of multilayer films from the VLDPE/HDPE polymer blends of the present invention. Multiple-layer films may be formed by methods well known in the art. The total thickness of multilayer films may vary based upon the application desired. A total film thickness of about 5–100 µm, more typically about 10–50 µm, is suitable for most applications. Those skilled in the art will appreciate that the thickness of individual layers for multilayer films may be adjusted based on desired end use performance, resin or copolymer employed, equipment capability and other factors. The materials forming each layer may be coextruded through a coextrusion feedblock and die assembly to yield a film with two or more layers adhered together but differing in composition.

When used in multilayer films, the VLDPE/HDPE polymer blend may be used in any layer of the film, or in more than one layer of the film, as desired. When more than one layer of the film is formed of a VLDPE/HDPE polymer blend of the present invention, each such layer can be individually formulated; i.e., the layers formed of the VLDPE/HDPE polymer blend can be the same or different chemical composition, density, melt index, thickness, etc., depending upon the desired properties of the film.

To facilitate discussion of different film structures of the invention, the following notation is used herein. Each layer of a film is denoted "A" or "B", where "A" indicates a conventional film layer as defined below, and "B" indicates a film layer formed of any of the VLDPE polymers of the present invention. Where a film includes more than one A layer or more than one B layer, one or more prime symbols (', ", '", etc.) are appended to the A or B symbol to indicate layers of the same type (conventional or inventive) that can be the same or can differ in one or more properties, such as chemical composition, density, melt index, thickness, etc. Finally, the symbols for adjacent layers are separated by a slash (/). Using this notation, a three-layer film having an inner layer of a VLDPE/HDPE polymer blend of the invention disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes of the present invention. The relative thickness of each film layer is similarly denoted, with the thickness of each layer relative to a total film thickness of 100 (dimensionless) is indicated numerically and separated by slashes; e.g., the relative thickness of an A/B/A' film having A and A' layers of 10 µm each and a B layer of 30 µm is denoted as 20/60/20.

For the various films described herein, the "A" layer can be formed of any material known in the art for use in multilayer films or in film-coated products. Thus, for example, the A layer can be formed of a polyethylene homopolymer or copolymer, and the polyethylene can be, for example, a VLDPE, a low density polyethylene (LDPE), an LLDPE, a medium density polyethylene (MDPE), or a high density polyethylene (HDPE), as well as other polyethylenes known in the art. The polyethylene can be produced by any suitable process, including metallocene-catalyzed processes and Ziegler-Natta catalyzed processes. Further, the A layer can be a blend of two or more such polyethylenes, and can include additives known in the art. Further, one skilled in the art will understand that the layers of a multilayer film must have the appropriate viscosity match.

In multilayer structures, one or more A layers can also be an adhesion-promoting tie layer, such as PRIMACOR™ ethylene-acrylic acid copolymers available from The Dow Chemical Co., and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, other polyethylenes, such as HDPE, LDPE, LMDPE, and MDPE, and paper.

The "B" layer is formed of a VLDPE/HDPE polymer blend of the invention, and can be any of such blends described herein. In one embodiment, the B layer is formed of a blend of a metallocene-catalyzed VLDPE polymer having a density of less than 0.916 g/cm$^3$ and a HDPE polymer having a density of greater than 0.940 g/cm$^3$. In another embodiment, the B layer is formed of a blend comprising: (a) a gas-phase metallocene-produced VLDPE copolymer of ethylene and at least one $C_3$ to $C_{12}$ alpha olefin and having a density of from 0.900 to 0.915 g/cm$^3$ and a melt index of from 0.5 to 10 g/10 min; and (b) a HDPE homopolymer or copolymer having a density of from 0.940 to 0.970 g/cm$^3$ and a melt index of from 0.01 to 45 g/10 min. In one embodiment, the B layer is formed of a blend comprising a gas-phase metallocene-produced VLDPE having a melt index having the lower limits of 0.5 g/10 min or more, 0.7 g/10 min or more, 1 g/10 min or more and having the upper limits of 5 g/10 min or less, 3 g/10 min or less, or 2 g/10 min or less, with melt index ranges from any lower limit to any upper limit being within the scope of the invention. In one preferred embodiment, the B layer is formed of a blend as described herein, wherein the VLDPE component of the blend has one or more of the following characteristics, in addition to the density, melt index, and other parameters described herein:

(a) a composition distribution CDBI of 50 to 85%, alternatively 60 to 80%, or 55 to 75%, or 55% or more to 70% or less;

(b) a molecular weight distribution Mw/Mn of 2 to 3, alternatively 2.2 to 2.8;

(c) a molecular weight distribution Mz/Mw of less than 2; and (d) the presence of two peaks in a TREF measurement.

The thickness of each layer of the film, and of the overall film, is not particularly limited, but is determined according to the desired properties of the film. Typical film layers have a thickness of about 1 to 1000 μm, more typically about 5 to 100 μm, and typical films have an overall thickness of 10 to 100 μm.

In one embodiment, the present invention provides a single-layer (monolayer) film formed of any of the VLDPE/HDPE polymer blends of the invention; i.e., a film having a single layer which is a B layer as described above.

In other embodiments, and using the nomenclature described above, the present invention provides multilayer films with any of the following exemplary structures:

(a) two-layer films, such as A/B and B/B';

(b) three-layer films, such as A/B/A', A/A'/B, B/A/B' and B/B'/B";

(c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'";

(d) five-layer films, such as A/A'/A"/A'"/B, A/A'/A"/B/A'", A/A'/B/A"/A'", A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A'/B'/B", A/B/A'/B'/A", B/A/B'/B"/A', A/B/B'/B"/B'", B/A/B'/B"/B'", B/B'/A/B"/B'", and B/B'/B"/B'"/B"";

and similar structures for films having six, seven, eight, nine or more layers. It should be appreciated that films having still more layers can be formed using the VLDPE/HDPE polymer blends of the invention, and such films are within the scope of the invention.

In any of the embodiments above, one or more A layers can be replaced with a substrate layer, such as glass, plastic, paper, metal, etc., or the entire film can be coated or laminated onto a substrate. Thus, although the discussion herein has focussed on multilayer films, the films of the VLDPE/HDPE polymer blends of the present invention can also be used in as coatings; e.g., films formed of the inventive polymers, or multilayer films including one or more layers formed of the inventive polymers, can be coated onto a substrate such as paper, metal, glass, plastic and other materials capable of accepting a coating. Such coated structures are also within the scope of the present invention.

As described below, the films can be cast films or blown films. The films can further be embossed, or produced or processed according to other known film processes. The films can be tailored to specific applications by adjusting the thickness, materials and order of the various layers, as well as the additives in each layer.

In one aspect, films containing a VLDPE/HDPE polymer blend, monolayer or multilayer, may be formed by using casting techniques, such as a chill roll casting process. For example, a composition can be extruded in a molten state through a flat die and then cooled to form a film. As a specific example, cast films can be prepared using a pilot scale commercial cast film line machine as follows. Pellets of the polymer are melted at a temperature ranging from about 250° C. to about 300° C. with the specific melt temperature being chosen to match the melt viscosity of the particular resins. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The material is then drawn down to the final gauge. The material draw down ratio is typically about 21:1 for 0.8 mil (20 μm) films. A vacuum box or air knife can be used to pin the melt exiting the die opening to a primary chill roll maintained at about 90° F. (32 C). The resulting polymer film is collected on a winder. The film thickness can be monitored by a gauge monitor, and the film can be edge trimmed by a trimmer. One or more optional treaters can be used to surface treat the film, if desired. Such chill roll casting processes and apparatus are well known in the art, and are described, for example, in The Wiley Encyclopedia of Packaging Technology, Second Edition, A. L. Brody and K. S. Marsh, Ed., John Wiley and Sons, Inc., New York (1997). Although chill roll casting is one example, other forms of casting can be used.

In another aspect, films containing a VLDPE/HDPE polymer blend, monolayer or multilayer, may be formed using blown techniques, i.e. to form a blown film. For example, the composition can be extruded in a molten state through an annular die and then blown and cooled to form a tubular, blown film, which can then be axially slit and unfolded to form a flat film. As a specific example, blown films can be prepared as follows. The VLDPE/HDPE polymer blend composition is introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film that was cooled by blowing air onto the surface of the film. The film is drawn from the die typically forming a cylindrical film that is cooled, collapsed and optionally subjected to a desired auxiliary process, such as slitting, treating, sealing or printing. The finished film can be wound into rolls for later processing, or can be fed into a bag machine and converted into bags. A particular blown film process and apparatus suitable for forming films according to embodiments of the present invention is described in U.S. Pat. No. 5,569,693. Of course, other blown film forming methods can also be used.

Yet, another aspect of the invention relates to an article formed by extrusion coating. For example, a substrate material can be contacted with the hot molten polymer as the polymer exits the die. For instance, an already formed polypropylene film may be extrusion coated with an ethylene copolymer film as the latter is extruded through the die. Extrusion coatings are generally processed at higher temperatures than cast films, typically about 600° F., in order to promote adhesion of the extruded material to the substrate. Other extrusion coating processes are known in the art, including those described, for example, in U.S. Pat. Nos. 5,268,230, 5,178,960 and 5,387,630. In one embodiment, the present invention is directed to a VLDPE/HDPE film or coating on a flexible substrate such as paper, metal foil or the like, wherein the film or coating is formed of a VLDPE/HDPE polymer blend. The coating may be a monolayer film or a multi-layer film. The substrate can also be stock for milk cartons, juice containers, films, etc.

In one embodiment, the coating is formed of a blend comprising a gas-phase metallocene-produced VLDPE, the VLDPE having a melt index having the lower limits of 5 g/10 min or more, 7 g/10 min or more, 9 g/10 min or more, 13 g/10 min or more, 14 g/10 min or more, 15 g/10 min and having the upper limit of 20 g/10 min or less, with melt index ranges from any lower limit to the upper limit being within the scope of the invention.

The films and coatings of the present invention are also suitable for use in laminate structures; i.e., with a film or a coating as described herein disposed between two substrates. These films and coatings are also suitable for use as heat sealing or moisture barrier layers in single- or multi-layer structures.

It should be emphasized that the VLDPE/HDPE blends, mono-layer and multilayer films, coatings, laminates, and other structures of the present invention can be produced by the methods described herein, or by other methods know in the art, and can use VLDPE and/or HDPE polymers produced by the methods described herein, or VLDPE and/or HDPE polymers produced by other methods known in the art.

Another aspect of the invention relates to a polymer product containing any one of the VLDPE/HDPE polymer blends. Such products include a number of film-based products, such as films made from the VLDPE/HDPE polymer blends, cast films, melt-blown films, coextruded films, films made of the VLDPE/HDPE polymer blends, laminated films, extrusion coatings, films with high oxygen transmission rates, multilayer films containing the VLDPE/HDPE polymer blends, sealing layers and cling layers that contain the VLDPE/HDPE polymer blends and products that include such sealing layers and cling layers. The multilayer films of the invention include a VLDPE/HDPE blend layer coextruded with metallocene catalyzed LLDPE, Ziegler-Natta catalyzed LLDPE, LDPE, MDPE, HDPE, EVA, EMA, polypropylene or other polymers. The blends of the invention, have the VLDPE/HDPE polymer together with other polymers, such as metallocene catalyzed LLDPE, Ziegler-Natta catalyzed LLDPE, LDPE, MDPE, EVA, EMA, polypropylene and copolymers such as ethylene/propylene copolymers. Another product of this invention includes VLDPE/HDPE polymer blends that has been rendered breathable and used either alone (as a single layer film) or in combination with one or more other layers or films or fabrics, including woven or nonwoven films or fabrics. The products also include extrusion coating compositions containing the VLDPE/HDPE polymer blend. These films can be made into other forms, such as tape, by any one of a number of well known cutting, slitting, and/or rewinding techniques. They may be useful as stretch, sealing, or oriented films. Surfaces of the films of this invention can be modified by known and conventional post-forming techniques such as corona discharge, chemical treatment, flame treatment, and the like.

This invention also includes products having specific end-uses, particularly film-based products for which the toughness properties are desirable, such as cling films, produce bags, lamination films, stretch films, bags (i.e. shipping sacks, trash bags and liners, industrial liners, and produce bags), flexible and food packaging (e.g., fresh cut produce packaging, frozen food packaging), personal care films pouches, medical film products (such as IV bags), diaper films, and housewrap. Products may also include packaging as bundling, packaging and unitizing a variety of products including various foodstuffs, rolls of carpet, liquid containers and various like goods normally containerized and/or palletized for shipping, storage, and/or display. Products may also include surface protection applications, with or without stretching, such as in the temporary protection of surfaces during manufacturing, transportation, etc. There are many potential applications of films produced from the polymer blends described herein that will be apparent to those skilled in the art.

5. EXAMPLES

Metallocene catalysts for the polymerization of the inventive VLDPE were prepared according to the methods as described above for an unbridged bis-Cp structure (such as a bis(1,3-methyl-n-butyl cyclopentadienyl) zirconium dichloride).

In certain examples, various properties of the polymers were measured according to the following test procedures, and it is understood that whenever these properties are discussed in this specification and in the claims, such properties are to be measured in accordance with these procedures.

Tensile strength values were measured (MD and TD) in accordance with ASTM D882-97, except that film gauge was measured using ASTM D374-94 Method C, and micrometer calibration was performed annually with a commercially available gauge block (Starret Webber 9, JCV1&2). As reflected in Table IV, tensile values were measured at yield MD and TD, 200% MD and TD and Ultimate Tensile MD and TD.Melt Index was determined according to ASTM D-1238-95. Melt index is reported in units of g/10 min, or the numerically equivalent units of dg/min.

The ACD protocol is an analytical-scale TREF (Temperature Rising Elution Fractionation) test for semi-crystalline copolymers to- characterize the composition distribution (CD). A sample is dissolved in a good solvent, cooled slowly to allow crystallization on a support, and then re-dissolved and washed from the support by heating during elution. Polymer chains are fractionated by differences in their crystallization temperature in solution, which is a function of composition (and defect structure). A mass detector provides concentration vs. elution temperature data; CD characterization is obtained by applying a calibration curve (i.e., mole % comonomer vs. temperature) established using narrow-CD standards. Two in-house Visual Basic programs are used for data acquisition and analysis.

There are really two distributions provided by the ACD test:
  Solubility Distribution (weight fraction vs. solubility temperature)—measured directly.
  Composition Distribution (weight fraction vs. comonomer content)—obtained by applying the calibration curve to the solubility distribution.

Emphasis is usually placed on characterization of the CD. However, the solubility distribution can be of equal or greater importance when:
  A calibration curve has not been established for the polymer of interest.
  The MW of the sample is low, or the MWD is broad enough that a significant portion of the sample is low MW (M<20k). Under these circumstances, the reported CD is influenced by the MW-dependence of solubility. The calibration curve must be corrected for the effect of MW to give the true CD, which requires a priori knowledge of the relative influence of MW and composition on solubility for a given sample. In contrast, the solubility distribution correctly accounts for contributions from both effects, without trying to separate them.

Note that the solubility distribution should depend on solvent type and crystallization/dissolution conditions. If correctly calibrated, the CD should be independent of changes in these experimental parameters.

Composition Distribution Breadth Index (CDBI) was measured using the following instrumentation: ACD: Modified Waters 150-C. for TREF (Temperature Rising Elution Fractionation) analysis (includes crystallization column, bypass plumbing, timing and temperature controllers); Column: 75 micron glass bead packing in (High Pressure Liquid Chromotography) HPLC-type column; Coolant: Liquid Nitrogen; Software: "A-TREF" Visual Basic programs; and Detector: Polymer Laboratories ELS-1000. Run conditions for the CDBI measurements were as follows:

GPC settings

| Mobile phase: | TCE (tetrachlororethylene) |
|---|---|
| Temperature: | column compartment cycles 5–115° C., injector compartment at 115° C. |
| Run time: | 1 hr 30 min |
| Equilibration time: | 10 min (before each run) |
| Flow rate: | 2.5 mL/min |
| Injection volume: | 300 µL |
| Pressure settings: | transducer adjusted to 0 when no flow, high pressure cut-off set to 30 bar |

Temperature controller settings

| Initial Temperature: | 115° C. | | |
|---|---|---|---|
| Ramp 1 Temperature: | 5° C. | Ramp time = 45 min | Dwell time = 3 min |
| Ramp 2 Temperature: | 115° C. | Ramp time = 30 min | Dwell time = 0 min |

Alternative temperature controller settings if two peaks are not exhibited in a TREF measurement.

| Initial Temperature: | 115° C. | | |
|---|---|---|---|
| Ramp 1 Temperature: | 5° C. | Ramp time = 12 hrs | Dwell time = 3 min |
| Ramp 2 Temperature: | 115° C. | Ramp time = 12 hrs | Dwell time = 0 min |

In some case, longer ramp times may be needed to show two peaks in a TREF measurement.

ELS settings

| Nebulizer temperature: | 120° C. |
|---|---|
| Evaporator temperature: | 135° C. |
| Gas flow rate: | 1.0 slm (standard liters per minute) |
| Heated transfer line temperature: | 120° C. |

Melt Index was determined according to ASTM D-1238-95. Melt index is reported in units of g/10 min, or the numerically equivalent units of dg/min.

Density (g/cm$^3$) was determined using chips cut from plaques compression molded in accordance with ASTM D-1928-96 Procedure C, aged in accordance with ASTM D618 Procedure A, and measured according to ASTM D1505-96.

In measuring the 1% Secant, the procedures in ASTM D882-97 were followed, except that the film gauge was measured according to ASTM D374-94 Method C, except that the micrometer calibration was performed annually with a commercially available gauge block (Starret Webber 9, JCV1&2).

In measuring Elmendorf Tear, the procedures in ASTM D 1922-94a were used, except that the film gauge was measured according to ASTM D374-94 Method C, except that the micrometer calibration was performed annually with a commercially available gauge block (Starret Webber 9, JCV1&2).

Dart Drop values were measured using the procedures in ASTM D1709-98 Method A, except that the film gauge was measured according to ASTM D374-94 Method C, except that the micrometer calibration was performed annually with a commercially available gauge block (Starret Webber 9, JCV1&2).

Haze was measured in accordance with ASTM D 1003-97.

Gloss was measured in accordance with ASTM D2457-97.

Total Energy was measured in accordance with ASTM D4272-90.

The probe puncture energy test was conducted using an Instron Universal tester that records a continuous reading of the force (stress) and penetration (strain) curve. A 6 inch by 6 inch (15 cm by 15 cm) film specimen was securely mounted to a compression load cell to expose a test area 4 inches (10 cm) in diameter. Two HDPE slip sheets each 2 in by 2 in (5 cm×5 cm) and each approximately 0.25 mil (6.35 µm) thick were loosely placed on the test surface. A ¾ in (1.9 cm) diameter elongated matte finished stainless steel probe, traveling at a constant speed of 10 in/min (25 cm/min) was lowered into the film, and a stress/strain curve was recorded and plotted. The "puncture force" was the maximum force (lb or N) encountered. The machine was used to integrate the area under the stress/strain curve, which is indicative of the energy consumed during the penetration to rupture testing of the film, and is reported as "puncture energy" or "break energy" (in·lb or J). The probe penetration distance was not recorded in this test.

Polydispersity or molecular weight index (Mw/Mn) is calculated based on the ratio of weight average molecular weight (Mw) and number average molecular weight (Mn) by size exclusion chromatography.

The definition of Composition Distribution Breadth Index (CDBI), and the method of determining CDBI, can be found in U.S. Pat. No. 5,206,075, which is fully incorporated by reference to the extent not inconsistent with the present inventions.

Hot tack strength was measured in accordance with the following procedure. The hot tack samples were 15 mm wide specimens cut from original films. The samples were back-taped (laminated) with 2 mil PET to avoid rupture at the transition of the seal and elongation or sticking to the seal bars. A Hot Tack Tester 3000, from J&B, was employed to make the seal, using a seal bar pressure of 0.5 Mpa, and a seal time of 0.5 sec. The hot tack strength was then determined, after a cooling time of 0.4 seconds and at a peel speed of 200 mm/min.

Film gauge was measured according to ASTM D374-94 Method C, except that the micrometer calibration was performed annually with a commercially available gauge block (Starret Webber 9, JCV1&2).

Shrink (%) was determined in the machine direction (MD) and transverse direction (TD) as follows. A 100 mm circle is cut from the film. The machine direction is marked, and then the specimen is talced and then heated. The amount of shrinkage is measured in both MD and TD, and is reported as % MD shrinkage and % TD shrinkage.

Melting information is determined by differential scanning calorimetry and is reported as second melting data. The sample in heated at a programmed rate of 10° C./min to a temperature above its melting range. The sample is then cooled at a programmed rate of 10° C./min to a temperature below its crystallization range. The sample is then reheated (2nd melting) at a programmed rate of 10° C./min.

In the following Examples, resins produced by various suppliers were used to demonstrate the unique and advantageous properties of the polymer blend compositions and films of the present invention. It should be understood that the specific numerical values of various parameters of these resins described below are nominal values.

EXACT® 3132 is a plastomer made using metallocene catalyst in a high pressure bulk polymerization process having a nominal density of 0.9031 g/cm$^3$, available from ExxonMobil Chemical Co., Houston, Tex.

EXCEED™ ECD-320 is a linear low density polyethylene made using metallocene catalyst in a gas phase polymerization process having a nominal density of 0.9178 g/cm$^3$, available from ExxonMobil Chemical Co., Houston, Tex.

EXCEED™ ECD-321 is a gas-phase metallocene produced VLDPE ethylene/hexene copolymer with a nominal Melt Index of 1.0 dg/min, a nominal density of 0.912 g/cm$^3$, a nominal melting point of 116.5° C. a CDBI of approximately 60–80%, an MWD (Mw/Mn) of approximately 2.5–2.6, and a Melt Flow Rate ($I_{21}/I_2$) of approximately 16–18, available from ExxonMobil Chemical Co., Houston, Tex.

EXCEED™ 350D60 is a linear low density polyethylene made using metallocene catalyst in a gas phase polymerization process having a nominal density of 0.918 g/cm$^3$, available from ExxonMobil Chemical Co., Houston, Tex.

ExxonMobil HDZ-198 is an experimental grade HDP-E having a nominal Melt Index of 2.0 dg/min and a nominal density of 0.965 g/cm$^3$, available from ExxonMobil Chemical Co., Houston, Tex.

ExxonMobil LL-3001 is a linear low density polyethylene made using Ziegler-Natta catalyst in a gas phase polymerization process h-aving a nominal density of 0.917 g/cm$^3$ and a melt index of 1.0 dg/min, available from ExxonMobil Chemical Co., Houston, Tex.

Dow Affinity 1840 is very low density polyethylene made using metallocene catalyst in a solution polymerization process having a nominal density of 0.9104 g/cm$^3$, available from Dow Chemical Co.

Dow Attane 4201 is a very low density polyethylene made using Ziegler-Natta catalyst in a solution polymerization process having a nominal density of 0.9132 g/cm$^3$, available from Dow Chemical Co.

NDA 111 is a hexene low density polyethylene that has been peroxide treated from a base product of NDA 101 to have a melt index of 0.55 dg/min.

In the data tables following, the names of several commercial EXCEED™ resins are abbreviated. Each occurrence of the abbreviated name should be interpreted as identifying a particular EXCEED™ resin. EXCEED™ and EXACT® are trademarks of ExxonMobil Chemical Co., Houston, Tex.

Example 1

Certain VLDPE polymer resins of the inventions herein were prepared using gas phase polymerization using metallocene catalyst systems as disclosed elsewhere herein. The invention resins are identified below in Table 1 as Samples A, G, H (EXCEED™ 321, 0.9129 g/cm$^3$), and I. The co-monomers used to make Samples A, G, H, and I were ethylene and hexene. Fluidized gas phase reactors were operated to produce the resulting copolymers.

The polymerizations were conducted in the continuous gas phase fluidized bed reactors. The fluidized beds of those reactors were made up of polymer granules. The gaseous feed streams of ethylene and hydrogen were introduced below each reactor bed into the recycle gas line. Hexene comonomer was introduced below the reactor bed. An inert hydrocarbon (isopentane) was also introduced to each reactor in the recycle gas line, to provide additional heat capacity to the reactor recycle gases. The individual flow rates of ethylene, hydrogen and hexene comonomer were controlled to maintain fixed composition targets. The concentration of the gases were measured by an on-line gas chromatograph to ensure relatively constant composition in the recycle gas stream.

The solid catalyst was injected directly into the fluidized beds using purified nitrogen. The catalyst rates were adjusted to maintain constant production rate. The reacting beds of growing polymer particles were maintained in a fluidized state by a continuous flow of the make up feed and recycle gas through each reaction zone. To maintain constant reactor temperatures, the temperature of the recycle gas was continuously adjusted up or down to accommodate any changes in the rate of heat generation due to the polymerization.

The fluidized bed was maintained at a constant height by withdrawing a portion of the bed at a rate equal to the formation of the particulate product. The product was transferred to a purger vessel to remove entrained hydrocarbons.

Specifically, the properties of certain "invention" polymers, i.e., those made in accordance with the gas polymerization processes corresponding to the invention, using metallocene catalysts, were compared with certain "comparative" polymers, i.e., polymers made in accordance with non-invention methods.

Referring now to the comparative examples, Sample B was made using a comparative polymer, specifically, a linear low density polyethylene (EXCEED™ 350D60, 0.9189 g/cm$^3$) made using metallocene catalyst in a gas phase polymerization process. Sample C was made using a linear low density polyethylene (ExxonMobil LL-3001, 0.9199 g/cm$^3$) made using Ziegler-Natta catalyst in a gas phase polymerization process. Sample D was made using a plastomer (EXACT® 3132, 0.9031 g/cm$^3$) made using metallocene catalyst in a high pressure bulk polymerization process. Sample E was made using a very low density polyethylene (Dow Attane 4201, 0.9132 g/cm$^3$) made using Ziegler-Natta catalyst in a solution polymerization process. Sample F was made using a very low density polyethylene (Dow Affinity 1840, 0.9104 g/cm$^3$) made using metallocene catalyst in a solution polymerization process. Sample J was made using a linear low density polyethylene (EXCEED™ ECD-320, 0.9178 g/cm$^3$) made using metallocene catalyst in a gas phase polymerization process. Sample K was made using a linear low density polyethylene (EXCEED™ 350D60, 0.9183 g/cm$^3$) made using metallocene catalyst in a gas phase polymerization process.

The resin densities, melt index test results, and characterization data are set forth in Table 1 below. Comparative examples of samples B-F and J-K are denoted in the table by an asterisk (*).

TABLE I

| Resin Properties | | | | | | |
|---|---|---|---|---|---|---|
| | A | B* | C* | D* | E* | F* |
| Resin | m-VLDPE | m-LLDPE (EXCEED 350D60) | ZN-LLDPE (LL-3001) | m-Plastomer (EXACT 3132) | ZN-VLDPE (Attane 4201) | m-VLDPE (Affinity 1840) |
| Density (g/cm$^3$) | | | | | | |
| Molded | 0.9129 | 0.9189 | 0.9199 | 0.9031 | 0.9132 | 0.9104 |
| Rheology | | | | | | |
| MI (I2) | 1.07 | 1.17 | 1.10 | 1.09 | 1.00 | 0.96 |
| HLMI (I21) | 18.50 | 19.14 | 30.03 | 18.03 | 30.37 | 35.54 |
| Ratio (I21/I2) | 17.29 | 16.36 | 27.30 | 16.54 | 30.37 | 37.02 |
| MI Swell | 1.12 | 1.08 | 1.17 | 1.01 | 1.14 | 1.23 |
| Hexene Content | | | | | | |
| Wt % | 9.6 | 7.1 | | | | |
| GPC-HT | | | | | | |
| Mn | 50612 | 48653 | | | | |
| Mw | 100908 | 100064 | | | | |
| Mw/Mn | 1.99 | 2.06 | | | | |
| Mz/Mw | 1.66 | 1.69 | | | | |
| Mz + 1/Mw | 2.46 | 2.52 | | | | |
| ACD | | | | | | |
| CDBI | 64.5 | 6.7 | | | | |
| % Solubles | 0.6 | 0.6 | | | | |
| DSC (Celsius) | | | | | | |
| 2$^{nd}$ melt-Peak | 118.34 | 120.70 | 124.56 | | 118.00 | 105.68 |
| 2$^{nd}$ peak | 103.41 | 109.62 | | 99.64 | 123.25 | |
| 3$^{rd}$ peak | | | | | 103.62 | |
| Delta H (J/g) | 112.06 | 126.96 | 128.45 | 94.76 | 112.45 | 108.61 |
| Crystallization-Peak | | | | | | |
| 2$^{nd}$ peak | | | | | | |
| 3$^{rd}$ peak | | | | | | |
| Delta H (J/g) | −118.11 | −129.63 | −130.28 | −96.17 | −114.28 | −114.41 |

| | G | H | I | J* | K* |
|---|---|---|---|---|---|
| Resin | m-VLDPE | m-VLDPE (ECD-321) | m-VLDPE | m-LLDPE (ECD-320) | m-LLDPE (EXCEED 350D60) |
| Density (g/cm$^3$) | | | | | |
| Molded | 0.9114 | 0.9129 | 0.9130 | 0.9178 | 0.9183 |
| Rheology | | | | | |
| MI (I2) | 0.97 | 1.17 | 1.07 | 1.14 | 1.12 |
| HLMI (I21) | 17.04 | 18.18 | 17.39 | 18.13 | 17.41 |
| Ratio (I21/I2) | 17.56 | 15.5 | 16.3 | 15.9 | 15.6 |
| MI Swell | 1.10 | 1.13 | 1.13 | 1.12 | 1.13 |
| Hexene Content | | | | | |
| Wt % | 10.2 | 10.4 | 10.0 | 8.2 | 7.2 |
| GPC-HT | | | | | |
| Mn | 52016 | 45411 | 44528 | 44050 | 46928 |
| Mw | 102647 | 101795 | 103827 | 103123 | 103842 |
| Mw/Mn | 1.97 | 2.24 | 2.33 | 2.34 | 2.21 |
| Mz/Mw | 1.61 | 1.73 | 1.75 | 1.74 | 1.73 |
| Mz + 1/Mw | 2.29 | 2.66 | 2.71 | 2.65 | 2.66 |
| ACD | | | | | |
| CDBI | 55.3 | 71.8 | 66.4 | 62.5 | 72.7 |
| % Solubles | 1.1 | 1.2 | 1.2 | 1.7 | 2.3 |
| DSC (Celsius) | | | | | |
| 2$^{nd}$ melt-Peak | 117.83 | 116.50 | 116.07 | 119.37 | 118.03 |
| 2$^{nd}$ peak | 101.72 | 100.81 | 100.43 | 106.36 | 107.76 |
| 3$^{rd}$ peak | | | | | |
| Delta H (J/g) | 109.84 | 113.44 | 122.44 | 131.67 | 132.32 |
| Crystallization-Peak | | 102.37 | 102.76 | 105.33 | 103.27 |

TABLE I-continued

| Resin Properties | | | | | |
|---|---|---|---|---|---|
| 2nd peak | | 89.42 | 89.96 | 94.87 | 94.51 |
| 3rd peak | | 60.58 | 61.33 | 64.74 | 66.16 |
| Delta H (J/g) | −112.19 | −121.36 | −122.46 | −132.01 | −130.65 |

Example 2

Three-layer films were formed by coextrusion. Table 2 shows the processing conditions. Sample 1 (comparative) comprised an inner layer formed of a HDPE resin (Exxon-Mobil HDZ 198) having a nominal density of 0.965 g/cm$^3$ and outer layers formed of a m-VLDPE resin (EXCEED™ 321) having a nominal density of 0.912 g/cm$^3$. The target thickness ratio of the three-layer film of Sample 1 was a 20/60/20 structure. Sample 2 (inventive) comprised an inner layer and outer layers formed of a blend comprising 80% by weight m-VLDPE (EXCEED™ 321) having a nominal density of 0.912 g/cm$^3$ and 20% by weight HDPE (Exxon-Mobil HDZ 198) having a nominal density of 0.965 g/cm$^3$. The target thickness ratio of the three-layer film of Sample 2 was a 33/33/33 structure.

"A Extruder" was a 2.0 inch extruder. "B extruder" was a 2.5 inch extruder. "C Extruder" was a 2.5 inch extruder. All extruders were smooth bore with a 30:1 L/D. In addition, "B Extruder" and "C Extruder" had a pineapple mixer at the screw tip for intensive mixing. Chilled air was used for the dual lip air ring and an Internal Cooling system was used for the bubble. The die was 7 inches in diameter with a 45 mil die gap.

TABLE 2

| | Sample 1 (Comparative) | Sample 2 |
|---|---|---|
| Outer Layer Composition | m-VLDPE (ECD 321) | 80% m-VLDPE (ECD 321) 20% HDPE (HDZ 198) |
| Outer Layer Resin Density, g/cm$^3$ | 0.912 | 80% 0.912 20% 0.965 |
| Outer Layer Resin MI, g/10 min | 1.0 | 80% 1.0 20% 2 |
| Inner Layer Composition | HDPE (HDZ 198) | 80% m-VLDPE (ECD 321) 20% HDPE (HDZ 198) |
| Inner Layer Resin Density, g/cm$^3$ | 0.965 | 80% 0.912 20% 0.965 |
| Inner Layer Resin Mi, g/10 min | 2 | 80% 1.0 20% 2 |
| Thickness Ratio of Structure | 20/60/20 | 33/33/33 |
| Upper Nip FPM | 127 | 127 |
| Lower Nip Tension | 17 | 17 |
| Outputs (lb/hr) | 220 | 220.8 |
| Gauge (mils) | 1.35 | 1.35 |
| Ext. A | | |
| P1 (psi) | 4,379 | 4,769 |
| P2 (psi) | 4,378 | 4,789 |
| Melt Temp (F.) | 400 | 421 |
| RPM | 30 | 50 |
| Zone 1 (F.) | 350 | 350 |
| Zone 2 (F.) | 410 | 410 |
| Zone 3 (F.) | 370 | 370 |
| Zone 4 (F.) | 370 | 370 |
| Scr. Chg. (F.) | 415 | 415 |
| Conn. Pipe (F.) | 414 | 415 |
| Ext. B | | |
| P1 (psi) | 2,749 | 3,723 |
| P2 (psi) | 2,738 | 3,740 |
| Melt Temp (F.) | 399 | 413 |
| RPM | 57 | 32 |
| Zone 1 (F.) | 350 | 350 |
| Zone 2 (F.) | 410 | 411 |
| Zone 3 (F.) | 375 | 375 |
| Zone 4 (F.) | 350 | 351 |
| Zone 4 (F.) | 350 | 350 |
| Scr. Chg. (F.) | 415 | 415 |
| Conn. Pipe (F.) | 415 | 415 |
| Ext. C | | |
| P1 (psi) | 5,426 | 5,949 |
| P2 (psi) | 5,400 | 5,946 |
| Melt Temp (F.) | 399 | 417 |
| RPM | 57 | 28 |
| Zone 1 (F.) | 350 | 350 |
| Zone 2 (F.) | 410 | 410 |
| Zone 3 (F.) | 375 | 375 |
| Zone 4 (F.) | 365 | 365 |
| Zone 5 (F.) | 365 | 365 |
| Scr. Chg. (F.) | 415 | 415 |
| Conn. Pipe (F.) | 415 | 415 |
| Die Body (F.) | 415 | 415 |
| Outer Lip (F.) | 450 | 450 |
| Inner Lip (F.) | 410 | 409 |

Table 3 shows the film properties of Sample 1 and Sample 2. Comparing Sample 1 with Sample 2, the film of Sample 2 comprising the a VLDPE/HDPE blend of the present invention show higher elmendorf tear and dart impact strength while still maintaining high gloss and low haze properties.

TABLE 3

| | Sample 1 (Comparative) | Sample 2 |
|---|---|---|
| Outer Layer Composition | m-VLDPE (ECD 321) | 80% m-VLDPE (ECD 321) 20% HDPE (HDZ 198) |
| Outer Layer Resin Density, g/cm$^3$ | 0.912 | 80% 0.912 20% 0.965 |
| Outer Layer Resin MI, g/10 min | 1.0 | 80% 1.0 20% 2 |
| Inner Layer Composition | HDPE (HDZ 198) | 80% m-VLDPE (ECD 321) 20% HDPE (HDZ 198) |
| Inner Layer Resin Density, g/cm$^3$ | 0.965 | 80% 0.912 20% 0.965 |
| Inner Layer Resin Mi, g/10 min | 2 | 80% 1.0 20% 2 |
| Thickness Ratio of Structure | 20/60/20 | 33/33/33 |

TABLE 3-continued

|  | Sample 1 (Comparative) | Sample 2 |
| --- | --- | --- |
| Gauge |  |  |
| Ave., mil (μm) | 1.34 (34) | 1.34 (34) |
| Variation, % | 20.4 | 11 |
| Dart Impact F-50 g/mil, (g/μm) | 110 (4.33) | 634 (24.96) |
| Elmendorf Tear |  |  |
| MD, g/mil (g/μm) | 46 (1.81) | 282 (11.10) |
| TD, g/mil (g/μm) | 188 (7.40) | 488 (19.21) |
| Tensile Strength @ Yield |  |  |
| MD, psi (MPa) | 3,079 (21.23) | 1,535 (10.58) |
| TD, psi (MPa) | 3,818 (26.32) | 1,770 (12.20) |
| Elongation @ Yield |  |  |
| MD, % | 5 | 7 |
| TD, % | 6 | 7 |
| Tensile @ Fail |  |  |
| MD, psi (MPa) | 7,913 (54.56) | 8602 (59.31) |
| TD, psi (MPa) | 6,221 (42.89) | 8,490 (58.54) |
| Elongation @ Fail |  |  |
| MD, % | 685 | 635 |
| TD, % | 653 | 688 |
| 1% Secant Modulus |  |  |
| MD, psi (MPa) | 90,162 (621.65) | 33,549 (231.31) |
| TD, psi (MPa) | 110,902 (764.64) | 39,361 (271.38) |
| Haze, % | 13 | 10 |
| Gloss | 71 | 63 |
| Peak Force, lb (N) | 14 (62.3) | 13 (57.9) |

Example 3

Monolayer blown films were produced. Extruder temperatures were from 380° F. (193° C.) to 390° F. (199° C.). The die temperature was 400° F. (204° C.). Sample 3 (comparative) comprised a monolayer formed of a LLDPE polymer (NDA 111) having a density of 0.918 g/cm³ and having a melt index of 0.55 g/10 min. To produce the LLDPE polymer (NDA 111) required peroxide cross-linking from a base product of NDA 101 which decreases the melt index from approximately 0.8 to 0.55 dg/min. Sample 4 (inventive) comprised a monolayer film formed of a blend comprising 80% by weight m-VLDPE (EXCEED™ 321) having a nominal density of 0.912 g/cm³ and having a melt index of 1.0 g/10 min and 20% by weight HDPE (ExxonMobil HD 7760) having a nominal density of 0.952 g/cm³ and having a melt index of 0.07 g/10 min. The blend has a calculated density of 0.921 g/cm³ and a calculated melt index of 0.57 g/10 min which is approximately the same as that of the LLDPE polymer (NDA 111). Table 4 shows the film properties of Sample 3 and Sample 4.

Comparing Sample 3 with Sample 4, the film of Sample 4 comprising the VLDPE/HDPE blend of the present invention showed better tensile strength and gauge variation than the film of Sample 3 comprising a LLDPE polymer in which the VLDPE/HDPE blend and the LLDPE polymer had similar densities and melt indexes.

In addition, industry standards require that the resins used in geomembrane applications having an oxidative induction time (OIT) of over 100 minutes as measured by an oxygen inhibition test at 200° C. Because peroxide cross-linking is used to form the LLDPE polymer (NDA 111) at the required melt index and melt strength, the peroxide decreases the active antioxidant which will cause low OIT numbers. Thus, the LLDPE (NDA 111) cannot meet this industry standard. Since the formation of the VLDPE/HDPE blend does not require the use of peroxide-cross-linking, the blend is able to have enough antioxidant to meet this industry standard.

TABLE 4

|  | Sample 3 (Comparative) | Sample 4 |
| --- | --- | --- |
| Composition | LLDPE (NDA 111) | 75% m-VLDPE (ECD 321) 25% HDPE (HD 7760) |
| Neat Resin |  |  |
| Melt Index, g/10 min | 0.55 | 75% 1.0 25% 0.07 |
| Density, g/cm³ | 0.918 | 75% 0.912 25% 0.952 |
| Blend |  |  |
| Calc. Melt Index, g/10 min |  | 0.57 |
| Calc. Density, g/cm³ |  | 0.921 |
| Gauge |  |  |
| Avg., mil (μm) | 3.2 (81) | 3.2 (81) |
| Variation, % | 8.3 | 6.6 |
| Elmendorf Tear |  |  |
| MD, g/mil (g/μm) | 204 (8.03) | 286 (11.3) |
| TD, g/mil (g/μm) | 740 (29.1) | 502 (19.8) |
| Tensile @ Yield |  |  |
| MD, psi (MPa) | 1,351 (9.315) | 1,462 (10.08) |
| TD, psi (MPa) | 1,444 (9.956) | 1,706 (11.76) |
| Tensile elongation @ Yield |  |  |
| MD, psi, % | 7 | 6 |
| TD, psi, % | 6 | 5 |
| Tensile @ Break |  |  |
| MD, psi (MPa) | 6,818 (47.01) | 8,200 (56.54) |
| TD, psi (MPa) | 6,174 (42.57) | 8,124 (56.01) |
| Tensile elongation @ Break |  |  |
| MD, % | 647 | 630 |
| TD, % | 772 | 672 |
| Puncture Peak Force, lb (N) | 23.9 (106) | 24.4 (109) |

All patents, test procedures, and other documents cited herein, including priority documents, are fully incorporated by reference to the extent such disclosure is not inconsistent with this invention and for all jurisdictions in which such incorporation is permitted.

While the foregoing discussion is directed to certain examples, versions and preferred embodiments of the present invention, other and further embodiments of the invention may be devised without departing from the basic scope thereof, and the scope of each invention disclosed herein is determined by the claims that follow, including their equivalents.

What is claimed is:

1. A polymer blend composition comprising:
   (a) a metallocene-catalyzed linear very low density polyethylene polymer having:
      (i) a density of 0.890 to 0.915 g/cm³,
      (ii) a composition distribution breadth index of 50 to 85%,
      (iii) a molecular weight distribution Mw/Mn of 2.0 to 3.0,
      (iv) a molecular weight distribution Mz/Mw of less than 2.0, and
      (v) two peaks in a TREF measurement; and (b) a high density polyethylene polymer having a density greater than 0.940 g/cm$^3$,
wherein the blend comprises 60% to 95% of the very low density polyethylene polymer and 40% to 5% of the high density polyethylene polymer, based on the total combined weight of the high density polyethylene polymer and the very low density polyethylene polymer.

2. The polymer blend composition of claim 1, wherein the very low density polyethylene polymer has a density of 0.900 to 0.915 g/cm$^3$.

3. The polymer blend composition of claim 1, wherein the very low density polyethylene polymer has a density of 0.910 to 0.915 g/cm$^3$.

4. The polymer blend composition of claim 1, wherein the very low density polyethylene polymer is a copolymer of ethylene and at least one comonomer selected from the group consisting of $C_3$ to $C_{12}$ alpha olefins.

5. The polymer blend composition of claim 1, wherein the high density polyethylene polymer has a melt index of from 0.01 g/10 min. to 45 g/10 min.

6. The polymer blend composition of claim 1, wherein the very low density polyethylene polymer has a melt index of at least 5 g/10 min.

7. A monolayer film comprising the polymer blend composition of any of claims 1–6.

8. The monolayer film of claim 7, wherein the monolayer film is a cast film.

9. The monolayer film of claim 7, wherein the monolayer film is a blown film.

10. A multilayer film comprising the polymer blend composition of any of claims 1–6.

11. The multilayer film of claim 10, wherein the multilayer film has a dart impact strength of 150 g/mil (5.9 g/μm) or above.

12. The multilayer film of claim 10, wherein the multilayer film has a dart impact strength of 600 g/mil (24 g/μm) or above.

13. The multilayer film of claim 10, wherein the multilayer film has an Elmendorf Tear strength in the machine direction of 50 g/mil (2.0 g/μm) or above.

14. The multilayer film of claim 10, wherein the multilayer film has an Elmendorf Tear strength in the machine direction of 250 g/mil (9.8 g/μm) or above.

15. The multilayer film of claim 10, wherein the multilayer film has an Elmendorf Tear strength in the transverse direction of 200 g/mil (7.9 g/μm) or above.

16. The multilayer film of claim 10, wherein the multilayer film has an Elmendorf Tear strength in the transverse direction of 450 g/mil (18 g/μm) or above.

17. An article, comprising a substrate and a film disposed on the substrate, the film comprising the polymer blend of any of claims 1–6.

18. A monolayer film comprising a polymer blend composition, the polymer blend composition comprising:
(a) a metailocene-catalyzed linear very low density polyethylene polymer having:
(i) a density of 0.890 to 0.915 g/cm$^3$,
(ii) a composition distribution breadth index of 50 to 85%,
(iii) a molecular weight distribution Mw/Mn of 2.0 to 3.0,
(iv) a molecular weight distribution Mz/Mw of less than 2.0, and
(v) two peaks in a TREF measurement; and
(b) a high density polyethylene polymer having a density greater than 0.940 g/cm$^3$,
wherein the blend comprises 60% to 95% of the very low density polyethylene polymer and 40% to 5% of the high density polyethylene polymer, based on the total combined weight of the high density polyethylene polymer and the very low density polyethylene polymer.

19. A multilayer film comprising a polymer blend composition, the polymer composition comprising:
(a) a metallocene-catalyzed linear very low density polyethylene polymer having:
(i) a density of 0.890 to 0.915 g/cm$^3$,
(ii) a composition distribution breadth index of 50 to 85%,
(iii) a molecular weight distribution Mw/Mn of 2.0 to 3.0,
(iv) a molecular weight distribution Mz/Mw of less than 2.0, and
(v) two peaks in a TREF measurement; and
(b) a high density polyethylene polymer having a density greater than 0.940 g/cm$^3$,
wherein the blend comprises 60% to 95% of the very low density polyethylene polymer and 40% to 5% of the high density polyethylene polymer, based on the total combined weight of the high density polyethylene polymer and the very low density polyethylene polymer.

20. The multilayer film of claim 19, wherein the multilayer film has a dart impact strength of 150 g/mil (5.9 g/μm) or above.

21. The multilayer film of claim 19, wherein the multilayer film has a dart impact strength of 600 g/mil (24 g/μm) or above.

22. The multilayer film of claim 19, wherein the multilayer film has an Elmendorf Tear strength in the machine direction of 50 g/mil (2.0 g/μm) or above.

23. The multilayer film of claim 19, wherein the multilayer film has an Elmendorf Tear strength in the machine direction of 250 g/mil (9.8 g/μm) or above.

24. The multilayer film of claim 19, wherein the multilayer film has an Elmendorf Tear strength in the transverse direction of 200 g/mil (7.9 g/μm) or above.

25. The multilayer film of claim 19, wherein the multilayer film has an Elmendorf Tear strength in the transverse direction of 450 g/mil (18 g/μm) or above.

26. The polymer blend of claim 1 wherein the high density polyethylene polymer is homopolymer polyethylene.

27. The monolayer film of claim 18 wherein the high density polyethylene polymer is homopolymer polyethylene.

28. The multiplayer film of claim 19 wherein the high density polyethylene polymer is homopolymer polyethylene.

29. The polymer blend of claim 1, wherein the metallocene-catalyzed linear very low density polyethylene polymer is produced using a catalyst compound having an un-bridged bis-Cp structure.

30. The monolayer film of claim 18, wherein the metallocene-catalyzed linear very low density polyethylene polymer is produced using a catalyst compound having an an-bridged bis-Cp structure.

31. The multilayer film of claim 19, wherein the metallocene-catalyzed linear very low density polyethylene polymer is produced using a catalyst compound having an un-bridged bis-Cp structure.

* * * * *